United States Patent [19]
Atkinson

[11] Patent Number: 5,911,479
[45] Date of Patent: Jun. 15, 1999

[54] SEATBELT COMFORT PAD

[76] Inventor: Robert A. Atkinson, 377 Chester Rd., Aldridge, Walsall WS9-OPH, United Kingdom

[21] Appl. No.: 09/022,373

[22] Filed: Feb. 12, 1998

[51] Int. Cl.$^6$ .................................................. B60R 22/00
[52] U.S. Cl. .......................................................... 297/482
[58] Field of Search ................................. 297/482, 468, 297/483; 280/808, 733

[56] References Cited

U.S. PATENT DOCUMENTS

| | | | |
|---|---|---|---|
| 3,397,913 | 8/1968 | Fein | 297/482 |
| 3,957,282 | 5/1976 | Finnigan | 297/482 |
| 4,838,378 | 6/1989 | Copes | 297/482 X |
| 5,584,536 | 12/1996 | White | 297/482 |
| 5,620,234 | 4/1997 | Gunby | 297/482 |

FOREIGN PATENT DOCUMENTS

| | | | |
|---|---|---|---|
| 2845544 | 4/1980 | Germany | 297/482 |
| 3019378 | 11/1981 | Germany | 297/482 |
| 3501747 | 9/1986 | Germany | 297/482 |

*Primary Examiner*—Peter R. Brown

[57] ABSTRACT

A new seatbelt comfort pad for providing comfort to the shoulder of a user of a seatbelt having a shoulder strap. The inventive device includes a base having first and second surfaces, a pair of ends, and a pair of sides. The second surface of the base has a plurality of spaced apart elongate ridges thereon which are extended between the ends of the base. A pair of spaced apart elongate side walls are extended from the first surface of the base to define a channel between them. A cross member is extended between the terminal edges of the side walls. The cross member is spaced apart from the first surface of the base to define an opening therebetween. The cross member is located on the side walls adjacent one of the ends of the base. The cross member preferably has a break through it.

10 Claims, 4 Drawing Sheets

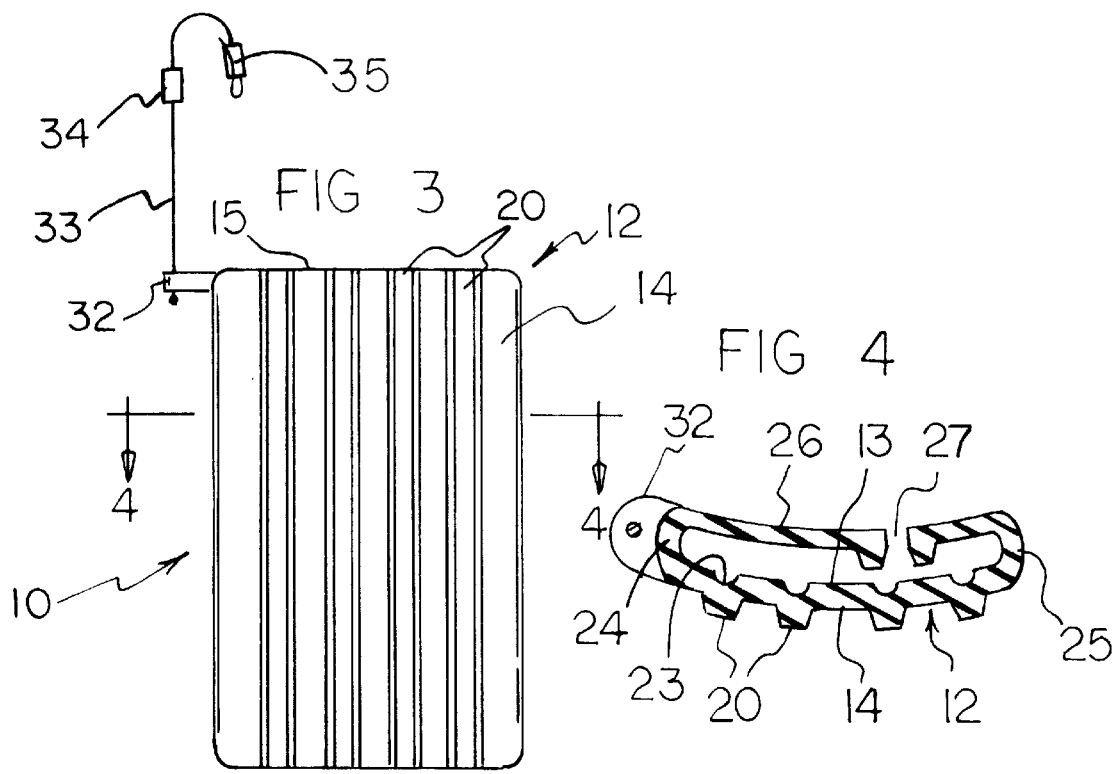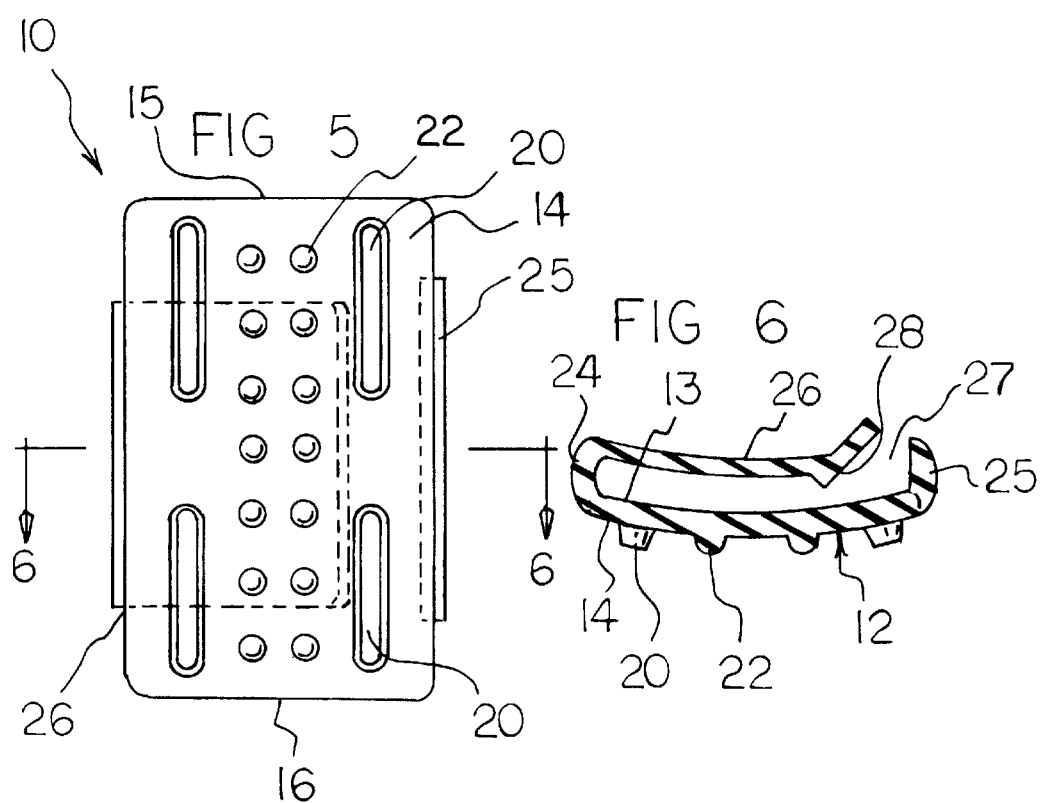

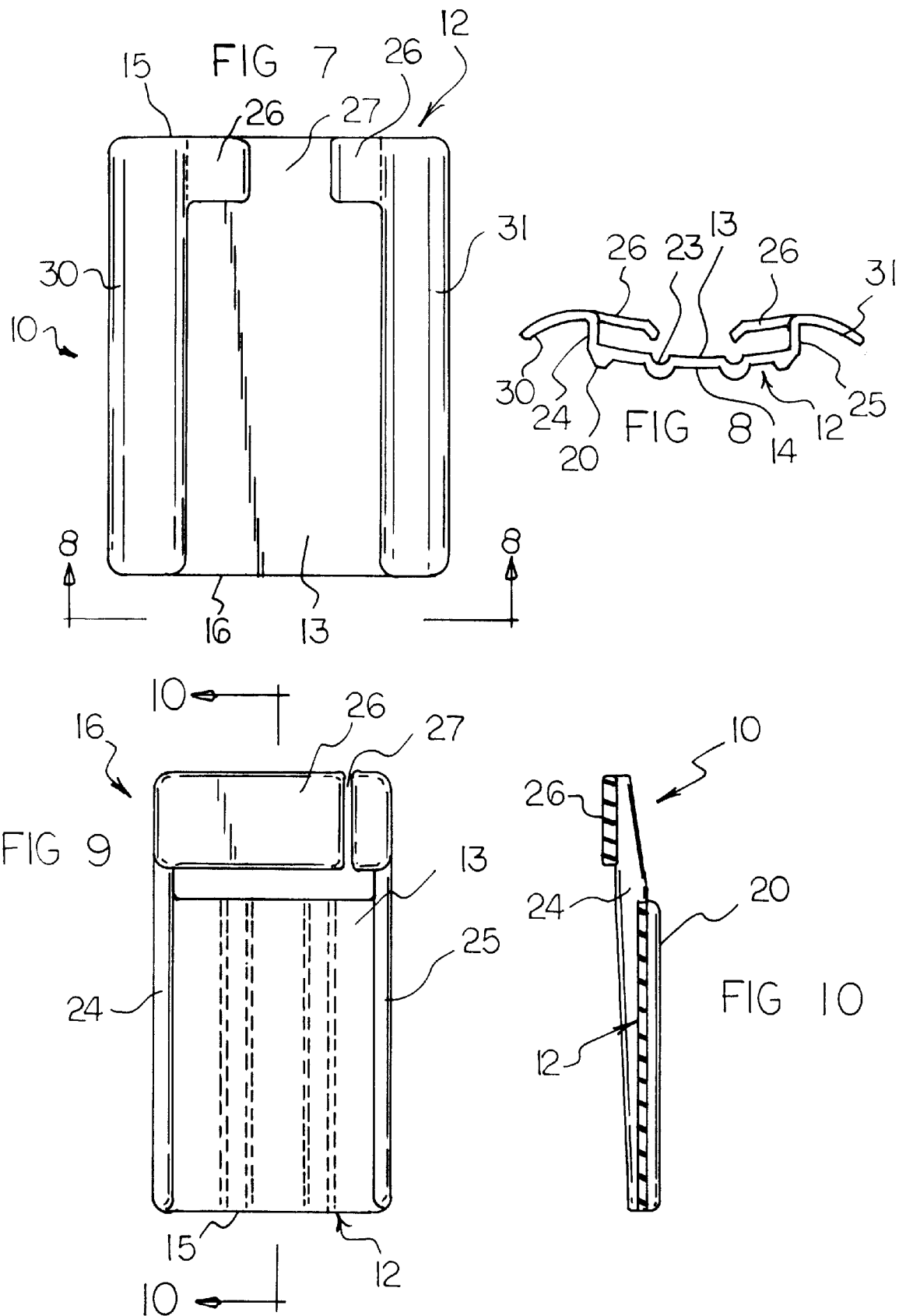

SEATBELT COMFORT PAD

BACKGROUND OF THE INVENTION

1. Field of the Invention

The present invention relates to seatbelt comfort pads and more particularly pertains to a new seatbelt comfort pad for providing comfort to the shoulder of a user of a seatbelt having a shoulder strap.

2. Description of the Prior Art

The use of seatbelt comfort pads is known in the prior art. More specifically, seatbelt comfort pads heretofore devised and utilized are known to consist basically of familiar, expected and obvious structural configurations, notwithstanding the myriad of designs encompassed by the crowded prior art which have been developed for the fulfillment of countless objectives and requirements.

Known prior art seatbelt comfort pads include U. S. Pat. No. 5,108,152; U.S. Pat. No. 5,416,957; U.S. Pat. No. Des. 317,829; U.S. Pat. No. 4,838,378; U.S. Pat. No. Des. 362, 536; U.S. Pat. No. 5,322,349; UK Patent No. GB 2057854 A (Bogner et. al.); and UK Patent No. GB 0767014 A (Norris).

While these devices fulfill their respective, particular objectives and requirements, the aforementioned patents do not disclose a new seatbelt comfort pad. The inventive device includes a base having first and second surfaces, a pair of ends, and a pair of sides. The second surface of the base has a plurality of spaced apart elongate ridges thereon which are extended between the ends of the base. A pair of spaced apart elongate side walls are extended from the first surface of the base to define a channel between them. A cross member is extended between the terminal edges of the side walls. The cross member is spaced apart from the first surface of the base to define an opening therebetween. The cross member is located on the side walls adjacent one of the ends of the base. The cross member preferably has a break through it.

In these respects, the seatbelt comfort pad according to the present invention substantially departs from the conventional concepts and designs of the prior art, and in so doing provides an apparatus primarily developed for the purpose of providing comfort to the shoulder of a user of a seatbelt having a shoulder strap.

SUMMARY OF THE INVENTION

In view of the foregoing disadvantages inherent in the known types of seatbelt comfort pads now present in the prior art, the present invention provides a new seatbelt comfort pad construction wherein the same can be utilized for providing comfort to the shoulder of a user of a seatbelt having a shoulder strap.

The general purpose of the present invention, which will be described subsequently in greater detail, is to provide a new seatbelt comfort pad apparatus and method which has many of the advantages of the seatbelt comfort pads mentioned heretofore and many novel features that result in a new seatbelt comfort pad which is not anticipated, rendered obvious, suggested, or even implied by any of the prior art seatbelt comfort pads, either alone or in any combination thereof.

To attain this, the present invention generally comprises a base having first and second surfaces, a pair of ends, and a pair of sides. The second surface of the base has a plurality of spaced apart elongate ridges thereon which are extended between the ends of the base. A pair of spaced apart elongate side walls are extended from the first surface of the base to define a channel between them. A cross member is extended between the terminal edges of the side walls. The cross member is spaced apart from the first surface of the base to define an opening therebetween. The cross member is located on the side walls adjacent one of the ends of the base. The cross member preferably has a break through it.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new seatbelt comfort pad apparatus and method which has many of the advantages of the seatbelt comfort pads mentioned heretofore and many novel features that result in a new seatbelt comfort pad which is not anticipated, rendered obvious, suggested, or even implied by any of the prior art seatbelt comfort pads, either alone or in any combination thereof.

It is another object of the present invention to provide a new seatbelt comfort pad which may be easily and efficiently manufactured and marketed.

It is a further object of the present invention to provide a new seatbelt comfort pad which is of a durable and reliable construction.

An even further object of the present invention is to provide a new seatbelt comfort pad which is susceptible of a low cost of manufacture with regard to both materials and labor, and which accordingly is then susceptible of low prices of sale to the consuming public, thereby making such seatbelt comfort pad economically available to the buying public.

Still yet another object of the present invention is to provide a new seatbelt comfort pad which provides in the apparatuses and methods of the prior art some of the advantages thereof, while simultaneously overcoming some of the disadvantages normally associated therewith.

Still another object of the present invention is to provide a new seatbelt comfort pad for providing comfort to the shoulder of a user of a seatbelt having a shoulder strap.

Yet another object of the present invention is to provide a new seatbelt comfort pad which includes a base having first and second surfaces, a pair of ends, and a pair of sides. The second surface of the base has a plurality of spaced apart elongate ridges thereon which are extended between the ends of the base. A pair of spaced apart elongate side walls ire extended from the first surface of the base to define a channel between them. A cross member is extended between the terminal edges of the side walls. The cross member is spaced apart from the first surface of the base to define an opening therebetween. The cross member is located on the side walls adjacent one of the ends of the base. The cross member preferably has a break through it.

Still yet another object of the present invention is to provide a new seatbelt comfort pad that allows air to circulate around the chest and shoulder of a user of a seatbelt having a shoulder strap to help reduce discomfort to a user from heat and sweat and helps to reduce the shock of an collision transferred from the seat belt to a user.

There is a further problem in that retractor mechanisms have been common for very many years now in order to retract the shoulder strap of a seatbelt so as not to leave loose lengths of strap lying around to become trapped in the door opening when the user exits the vehicle. Such loose lengths can become damaged by being trapped so that the strength thereof is reduced, and can catch the feet of a person entering or leaving the vehicle, with the risk of causing an accident. But the fixing of a belt pad to the strap will prevent the belt being fully retracted when not in use thus again creating a loose length of unretracted strap. In order to solve this problem, the pad of the invention is preferably characterized in that the pad provides a channel along which a buckle on the strap can slide so that when the strap is retracted the buckle can travel into the channel so that that the strap can move through the upper seat belt mount to close to the usual limit in which the buckle abuts the upper seat belt mounting when the strap is fully retracted and so that the free length of the strap not retracted when the pad is attached is kept at a minimum.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic back side view of the present invention.

FIG. 4 is a schematic sectional view of the present invention taken from line 4—4 on FIG. 3.

FIG. 5 is a schematic back side view of an additional embodiment of the present invention.

FIG. 6 is a schematic sectional view of the additional embodiment of the present invention taken from line 6—6 of FIG. 5.

FIG. 7 is a schematic front side view of a third embodiment of the present invention having flanges.

FIG. 8 is a schematic side view of the third embodiment of the present invention as seen from line 8—8 of FIG. 7.

FIG. 9 is a schematic top side view of a fourth embodiment of the present invention.

FIG. 10 is a schematic sectional view of the fourth embodiment of the present invention as seen from line 10—10 on FIG. 9.

DESCRIPTION OF THE PREFERRED EMBODIMENT

Figure 1:
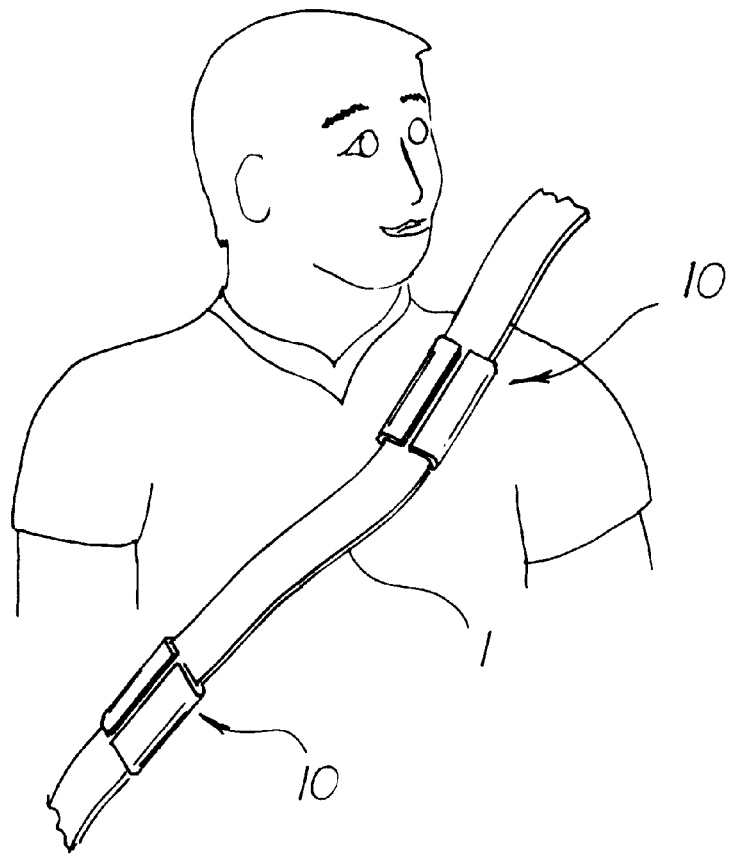
FIG. 1 is a schematic perspective view of two new seatbelt comfort pads in use on a shoulder strap according to the present invention.

With reference now to the drawings, and in particular to FIGS. 1 through 11 thereof, a new seatbelt comfort pad embodying the principles and concepts of the present invention and generally designated by the reference numeral 10 will be described.

The pad 10 is designed for attachment to the shoulder strap 1 of a seatbelt of a vehicle. As best illustrated in FIGS. 1 through 11, the seatbelt comfort pad 10 generally comprises a base 12 having first and second surfaces 13,14, a pair of ends 15,16, and a pair of sides. The second surface of the base 12 has a plurality of spaced apart elongate ridges 20 thereon which are extended between the ends 15,16 of the base 12. A pair of spaced apart elongate side walls 24,25 are extended from the first surface 13 of the base 12 to define a channel between them. A cross member 26 is extended between the terminal edges of the side walls 24,25. The cross member 26 is spaced apart from the first surface 13 of the base 12 to define an opening therebetween. The cross member 26 is located on the side walls 24,25 adjacent one of the ends 15,16 of the base 12. The cross member 26 preferably has a break 27 through it.

In closer detail, the base 12 is generally rectangular and has first and second surfaces 13,14, a pair of ends 15,16, a pair of sides, and a plurality of corners. The sides of the base 12 are extended between the ends 15,16 of the base 12. Preferably, the base 12 comprises a resiliently flexible elastomeric material, such as plastic. Also preferably, the corners of the base 12 are rounded to help prevent catching of the corners on an object or injuring a user. Ideally, the base 12 has a length defined between the ends 15,16 of the base 12 and is less than about 6 inches. In this ideal embodiment, the base 12 also has a width which is defined between the sides of the base 12 of less than about 2½ inches.

The second surface 14 of the base 12 is designed for abutting a user wearing a shoulder strap seatbelt and has a plurality of spaced apart elongate ridges 20 thereon. The ridges 20 are extended between the ends 15,16 of the base 12 and are preferably generally parallel to one another. The ridges 20 are designed for aiding the flow of air through it between the ends 15,16 of the base 12. Ideally, the height of each of the ridges 20 outwardly extending from the second surface 14 of the base 12 is greater than about 4 mm.

Preferably, the ridges 20 of the second surface have a length extending between the ends 15,16 of the base 12. In an optional embodiment as illustrated in FIG. 5, the length of the ridges 20 may be is less than about half the length of the length of the base 12.

With reference to FIG. 5, in this optional embodiment, it is preferred that the second surface of the base 12 include a plurality of nubs 22 extending from it. The nubs 22 are arranged in a plurality of elongate rows whose lengths extend between the ends 15,16 of the base 12. Preferably, the nubs 22 are interposed between the ridges 20 of the second surface of the base 12 with respect to the sides of the base 12.

The first surface 13 of the base 12 is designed for positioning adjacent a shoulder strap 1 of a seat belt and preferably has a plurality of elongate grooves 23 therein with the lengths of the grooves 23 extending between the ends 15,16 of the base 12. Preferably, as illustrated in FIG. 4, each the groove 23 of the first surface of the base 12 is associated with a ridge 20 of the second surface 14 of the base 12. Each the associated groove and ridge is aligned such that the lengths of each associated groove and ridge define a plane generally perpendicular to a plane defined by the first surface 13 of the base 12.

The pair of spaced apart elongate side walls 24,25 are extended from the first surface 13 of the base 12 with one of the side walls 24 is located at one of the sides of the base 12 and the other side wall 25 located at another of the sides of the base 12. The length of each side wall extends between the ends 15,16 of the base 12. The side walls 24,25 define a channel between them which is designed for positioning a shoulder strap 1 of a seatbelt therein. Each side wall 24,25 terminates at a terminal edge from which a cross member 26 is extended between the side walls 24,25. The cross member 26 is spaced apart from the first surface of the base 12 to define an opening therebetween. The cross member 26 is preferably located on the side walls 24,25 adjacent one of the ends 15 of the base 12. Each side wall has a height defined between its respective terminal edge and the first surface of the base 12. Preferably, the height of the side walls 24,25 tapers towards another of the ends 15,16 of the base 12. Ideally the height of the side walls is less than about ½ inch.

In an optional embodiment, as illustrated in FIGS. 9 and 10, each of the side walls 24,25 has an end which extends from the one end 15 of the base 12. In this embodiment, the cross member 26 is located adjacent the ends of the side walls 24,25 such that the cross member 26 is spaced apart from the one end 15 of the base 12 to define a space for permitting abutment 28 to the cross member 26 by the buckle on the shoulder strep 1 of a seatbelt when the strap is retracted.

Figure 2:
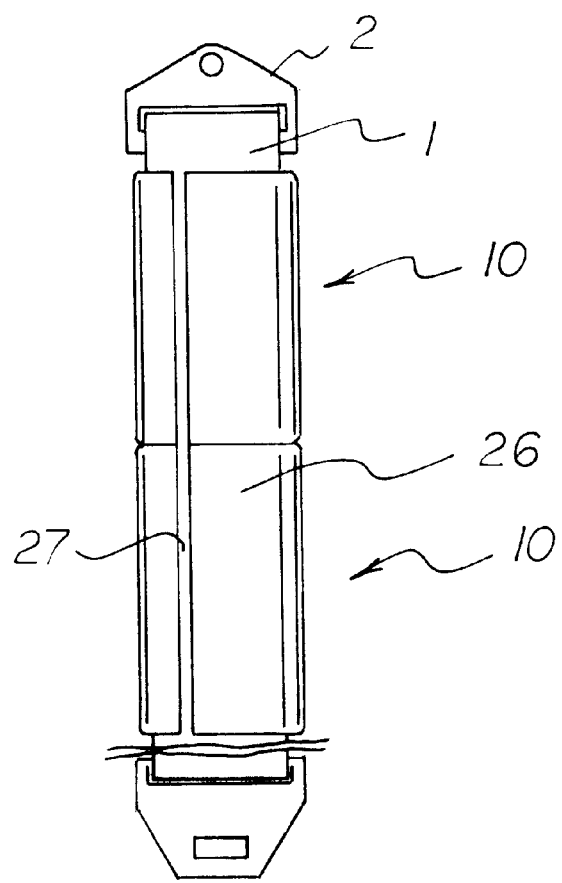
FIG. 2 is a schematic front side view of two of the present invention positioned adjacent to each other.

Preferably, the cross member 26 has a break 27 through it to define a pair of opposing arms. As illustrated in FIGS. 1 and 2, the cross member preferably extend the length of the base and has the length of the break 27 extend between the ends 15,16 of the base 12. Preferably as illustrated in FIG. 4, the break 27 is located between the mid point axis of the base 12 (which extends between the ends 15,16 of base 12 at a mid point between the sides of the base 12) and one of the sides of the base 12. In an optional embodiment illustrated in FIGS. 5 and 6, the break 27 may be located adjacent one of the side walls 24,25. The break 27 is designed for permitting attachment and removal of the pad to a shoulder strap 1 of a seatbelt. With reference to FIG. 6, ideally, the cross member 26 has an abutment 28 extending from it which is located at the break 27. A portion abutment 28 of the flange is extended into the channel and is adapted for helping hold holding a shoulder strap 1 in the channel. Optionally, as shown in FIGS. 7 and 8, each of the side walls 24,25 has an elongate arcuate flange 30,31 outwardly extending from each of them in a outwards direction from the sides of the base 12 with the length of the flanges 30,31 extending along the length of its respective side wall.

Figure 11:
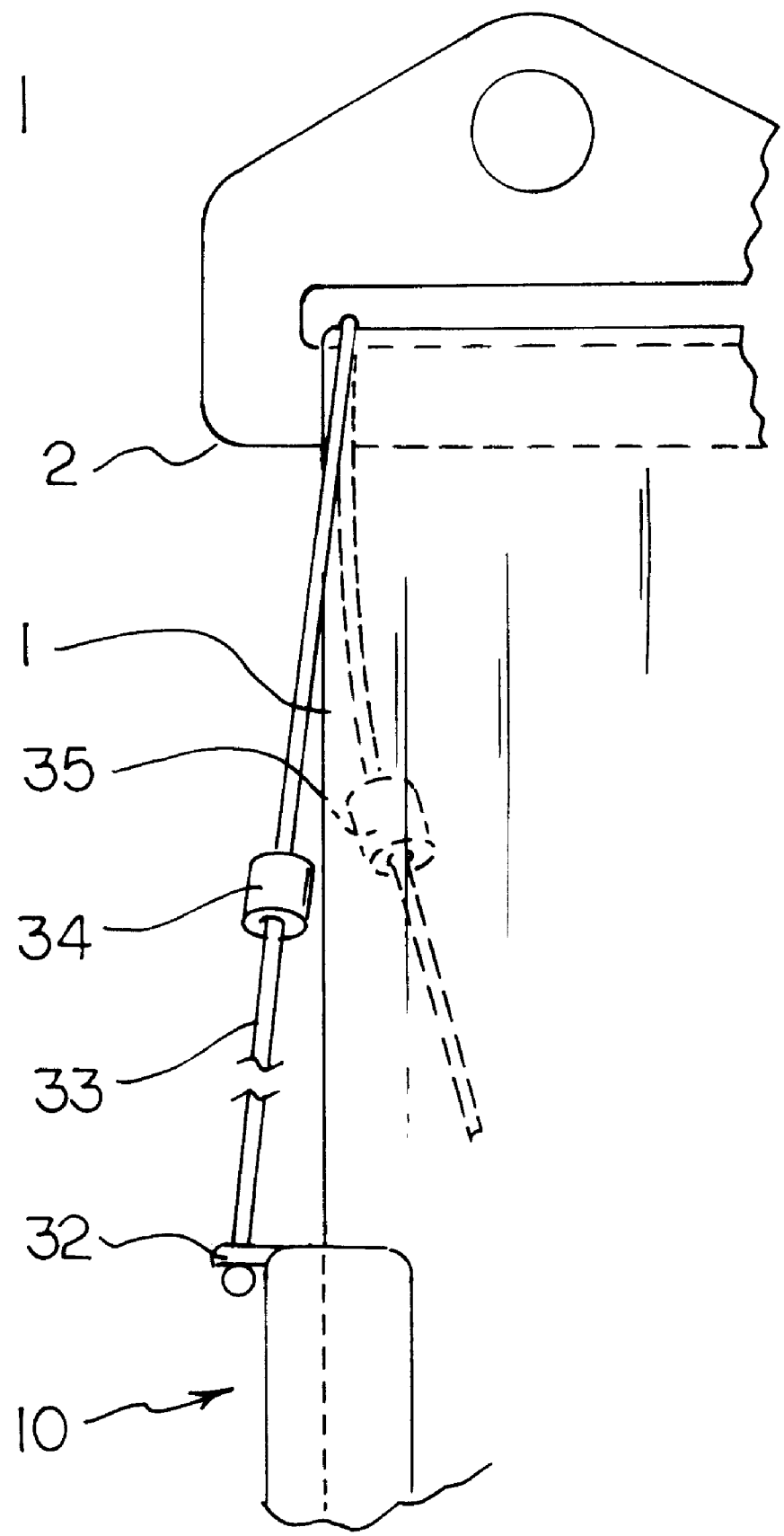
FIG. 11 is a schematic front side view of the present invention showing the attachment of the flexible line and grommets to the upper mount of a seat belt.

In the preferred embodiment, a tab 32 extends from one of the sides of the base 12. The tab 32 is preferably located adjacent one of the ends 15 of the base 12. An flexible elongate member 33 is coupled to the tab 32. A pair of spaced apart grommets 34,35 are coupled to the flexible elongate member 33. In use, as illustrated in FIG. 11, the flexible elongate member 33 and the grommets 34,35 are adapted for engaging a upper mount 2 of a seat belt such that the mount 2 is interposed between the grommets 34,35 when the flexible elongate member 33 is extended through the upper mount 2. The flexible elongate member 33 and the grommets 34,35 are designed for helping hold the pad 10 in a generally fixed position high on the chest of a user of a shoulder strap seat belt.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pad for attachment to the shoulder strap of a seatbelt of a vehicle, said pad comprising:

a base being generally rectangular and having first and second surfaces, a pair of ends, a pair of sides, and a plurality of corners, said sides of said base being extended between said ends of said base;

said second surface of said base having a plurality of spaced apart elongate ridges thereon, said ridges being extended between said ends of said base for comforting purposes;

wherein said ridges of said second surface have a length being extended between the ends of said base;

a pair of spaced apart elongate side walls being extended from said first surface of said base, one of said side walls being located at one of said sides of said base, another of said side walls being located at another of said sides of said base, each side wall having a length being extended between said ends of said base, said side walls defining a channel therebetween, said channel being for positioning a shoulder strap of a seatbelt therein;

wherein each of said side walls terminates at a terminal edge being extended from said first surface of said base;

a cross member being coupled to and extended between said terminal edges of said side walls, said cross member being spaced apart from said first surface of said base to define an opening therebetween;

wherein said cross member has a break therethrough for allowing access to the channel; and a tab being coupled to and extended from one of said sides of said base, said tab being located adjacent one of said ends of said base, a flexible elongate member being coupled to said tab, a pair of spaced apart grommets being coupled to said flexible elongate member, the flexible elongate member and the grommets being adapted for engaging in upper mount of the seat belt such that the upper mount is interposed between the grommets when the flexible elongate member is extended through the upper mount to hold the pad in a generally fixed position high on a chest of a user.

2. The pad of claim 1, wherein said base comprises a resiliently flexible elastomeric material.

3. The pad of claim 1, wherein said corners of said base are rounded.

4. The pad of claim 1, wherein said base has a length being defined between said ends of said base, wherein said length of said base is less than about 6 inches, herein said base has a width being defined between said sides of said base, wherein said width of said base is less than about 2 ½ inches.

5. The pad of claim 1, wherein said ridges are generally parallel to one another.

6. The pad of claim 1, wherein said cross member is located on said side walls adjacent one of said ends of said base.

7. The pad of claim 1, wherein said base has a mid point axis being extended between said ends of base, said mid point axis being located at a mid point between said sides of said base.

8. The pad of claim 7, wherein said break is located between said mid point axis of said base and one of said sides of said base.

9. The pad of claim 1, wherein the ridges each have a trapezoidal cross-section.

10. The pad of claim 1, wherein terminal edges defined by the break include lips extending inwardly into the channel.

* * * * *